（12）United States Patent
Dyson et al.

(10) Patent No.: US 10,605,098 B2
(45) Date of Patent: Mar. 31, 2020

(54) BLADE WITH TIP RAIL COOLING (71) Applicant: General Electric Company, Schenectady, NY (US)

(72) Inventors: Thomas Earl Dyson, Niskayuna, NY (US); Nicholas William Rathay, Rock City Falls, NY (US); Brendon James Leary, Simpsonville, SC (US); Gregory Terrence Garay, West Chester, OH (US); Gustavo Adolfo Ledezma, Delmar, NY (US); David Wayne Weber, Simpsonville, SC (US); Aaron Ezekiel Smith, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 169 days.

(21) Appl. No.: 15/648,541

(22) Filed: Jul. 13, 2017

(65) Prior Publication Data

US 2019/0017391 A1 Jan. 17, 2019

(51) Int. Cl.
*F01D 5/18* (2006.01)
*F01D 5/20* (2006.01)
*F01D 5/14* (2006.01)
*F01D 5/30* (2006.01)

(52) U.S. Cl.
CPC ............ *F01D 5/187* (2013.01); *F01D 5/141* (2013.01); *F01D 5/20* (2013.01); *F01D 5/3007* (2013.01); *F05D 2220/323* (2013.01); *F05D 2240/307* (2013.01); *F05D 2260/201* (2013.01); *F05D 2260/202* (2013.01); *F05D 2260/205* (2013.01)

(58) Field of Classification Search
CPC . F01D 5/187; F01D 5/141; F01D 5/20; F01D 5/3007; F05D 2220/323; F05D 2240/307; F05D 2260/201; F05D 2260/202; F05D 2260/205
See application file for complete search history.

(56) References Cited

U.S. PATENT DOCUMENTS

| 5,476,364 A | 12/1995 | Kildea |
| 6,971,851 B2 | 12/2005 | Liang |
| 7,118,342 B2 | 10/2006 | Lee et al. |

(Continued)

FOREIGN PATENT DOCUMENTS

| CA | 2449335 A1 | 5/2004 |
| DE | 199 44 923 A1 | 3/2001 |
| EP | 1762701 B1 | 4/2014 |

OTHER PUBLICATIONS

Extended European Search Report and Opinion issued in connection with corresponding EP Application No. 18182280.0 dated Dec. 5, 2018.

(Continued)

*Primary Examiner* — Kenneth J Hansen
*Assistant Examiner* — Eric J Zamora Alvarez
(74) *Attorney, Agent, or Firm* — McGarry Bair PC (57) ABSTRACT

An apparatus and method for cooling a blade tip for a turbine engine can include an blade, such as a cooled turbine blade, having a tip rail extending beyond a tip wall enclosing an interior for the blade at the tip. A plurality of film-holes can be provided in the tip rail. A flow of cooling fluid can be provided through the film-holes from the interior of the blade to cool the tip of the blade.

5 Claims, 8 Drawing Sheets (56) References Cited

U.S. PATENT DOCUMENTS

| | | |
|---|---|---|
| 7,922,451 B1 | 4/2011 | Liang |
| 8,079,811 B1 | 12/2011 | Liang |
| 8,172,507 B2 | 5/2012 | Liang |
| 8,469,666 B1 | 6/2013 | Liang |
| 9,085,988 B2 | 7/2015 | Kwon et al. |
| 9,188,012 B2 | 11/2015 | Lacy et al. |
| 9,249,670 B2 | 2/2016 | Bunker |
| 9,273,561 B2 | 3/2016 | Lacy et al. |
| 9,297,262 B2 * | 3/2016 | Zhang ............... F01D 5/186 |
| 2014/0178207 A1 * | 6/2014 | He ..................... F01D 5/20 |
| | | 416/96 R |
| 2016/0153284 A1 | 6/2016 | Kwon et al. |

OTHER PUBLICATIONS

Japanese Office Action issued in connection with corresponding JP Application No. 2018132041 dated Aug. 20, 2019.

* cited by examiner

BLADE WITH TIP RAIL COOLING

BACKGROUND OF THE INVENTION

Turbine engines, and particularly gas or combustion turbine engines, are rotary engines that extract energy from a flow of combusted gases passing through the engine onto a multitude of rotating turbine blades, and in some cases, such as aircraft, generate thrust for propulsion.

Gas turbine engines for aircraft are designed to operate at high temperatures to maximize engine efficiency, so cooling of certain engine components, such as a high pressure turbine and a low pressure turbine, can be beneficial. Typically, cooling is accomplished by ducting cooler air from high and/or low pressure compressors to the engine components that require cooling. Temperatures in the high pressure turbine can be 1000° C. to 2000° C. and the cooling air from the compressor can be 500° C. to 700° C., enough of a difference to cool the high pressure turbine.

Contemporary turbine blades, as well as vanes or nozzles, generally include one or more interior cooling circuits for routing the cooling air through the blade to cool different portions of the blade, and can include dedicated cooling circuits for cooling different portions of the blade, such as the leading edge, trailing edge and tip of the blade.

Turbine blade tip rails in particular help to reduce aero losses and therefore increase the efficiency of turbine engines. The tip rail is subjected to a high heat loads and is difficult to effectively cool. It is frequently one of the hottest regions in the blade.

BRIEF DESCRIPTION OF THE INVENTION

In one aspect, the disclosure relates to a blade for a turbine engine, the blade comprising a body defining an interior, and extending axially between a leading edge and a trailing edge to define a chord-wise direction and radially between a root and a tip to define a span-wise direction, which terminates in a tip end wall and a tip rail extending from the tip end wall, at least one cooling passage formed in the interior, at least two, radially-spaced cooling cavities within the tip rail and comprising at least one cooling conduit fluidly coupled to the cooling passage, at least one connecting conduit fluidly coupling the cooling cavities, and a set of film-holes having an inlet fluidly coupled to at least one of the radially-spaced cooling cavities and an outlet provided on an exterior surface of the tip rail.

In another aspect, the disclosure relates to a blade for a turbine engine, the blade comprising a body defining an interior, and extending axially between a leading edge and a trailing edge to define a chord-wise direction and radially between a root and a tip to define a span-wise direction, which terminates in a tip end wall and a tip rail extending from the tip end wall, at least one cooling passage formed in the interior, at least two, radially-spaced cooling cavities within the tip rail and comprising at least one cooling conduit fluidly coupled to the cooling passage, at least one connecting conduit fluidly coupling the cooling cavities, and a set of film-holes having an inlet fluidly coupled to at least one of the radially-spaced cooling cavities and an outlet provided on an exterior surface of the tip rail.

In yet another aspect, the disclosure relates to a method of maintaining cooling of a tip rail of a blade for a turbine engine, the method comprising supplying cooling air through a series of radially-spaced cooling cavities in the tip rail.

DETAILED DESCRIPTION OF THE INVENTION

Aspects of the disclosure described herein are directed to a tip of a blade including spaced cooling cavities having outlets formed in at least a portion of a tip rail. For purposes of illustration, the present disclosure will be described with respect to a blade for a turbine in an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference. A "set" as used herein can include any number of a particular element, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
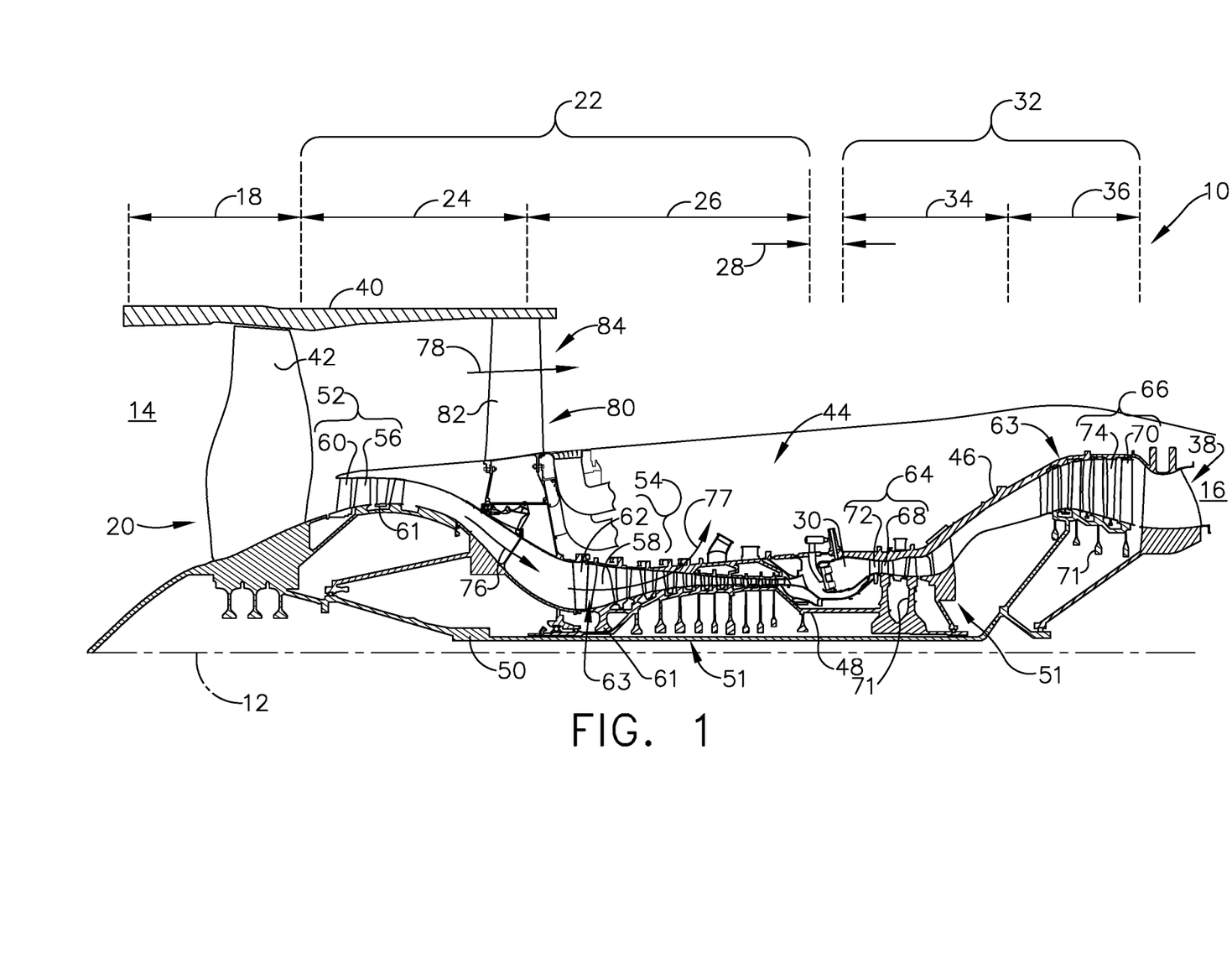
FIG. 1 is a schematic cross-sectional diagram of a portion of a turbine engine for an aircraft.

FIG. 1 is a schematic cross-sectional diagram of a portion of a gas turbine engine 10 for an aircraft. The engine 10 has a longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12 and rotatable within the fan casing 40. The HP compressor 26, the combustor 30, and the HP turbine 34 form a core 44 of the engine 10, which generates and extracts energy from combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and are ultimately discharged from the engine 10 via the exhaust section 38. The driving of the LP turbine 36 drives the LP spool 50 to rotate the fan 20 and the LP compressor 24.

A portion of pressurized airflow 76 generated in the compressor section 22 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of airflow 78 from the fan section 18 bypasses the LP compressor 24 and engine core 44 and exits the engine assembly 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 is utilized adjacent the fan section 18 to exert some directional control of the airflow 78.

The airflow 78 can be a cooling fluid used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
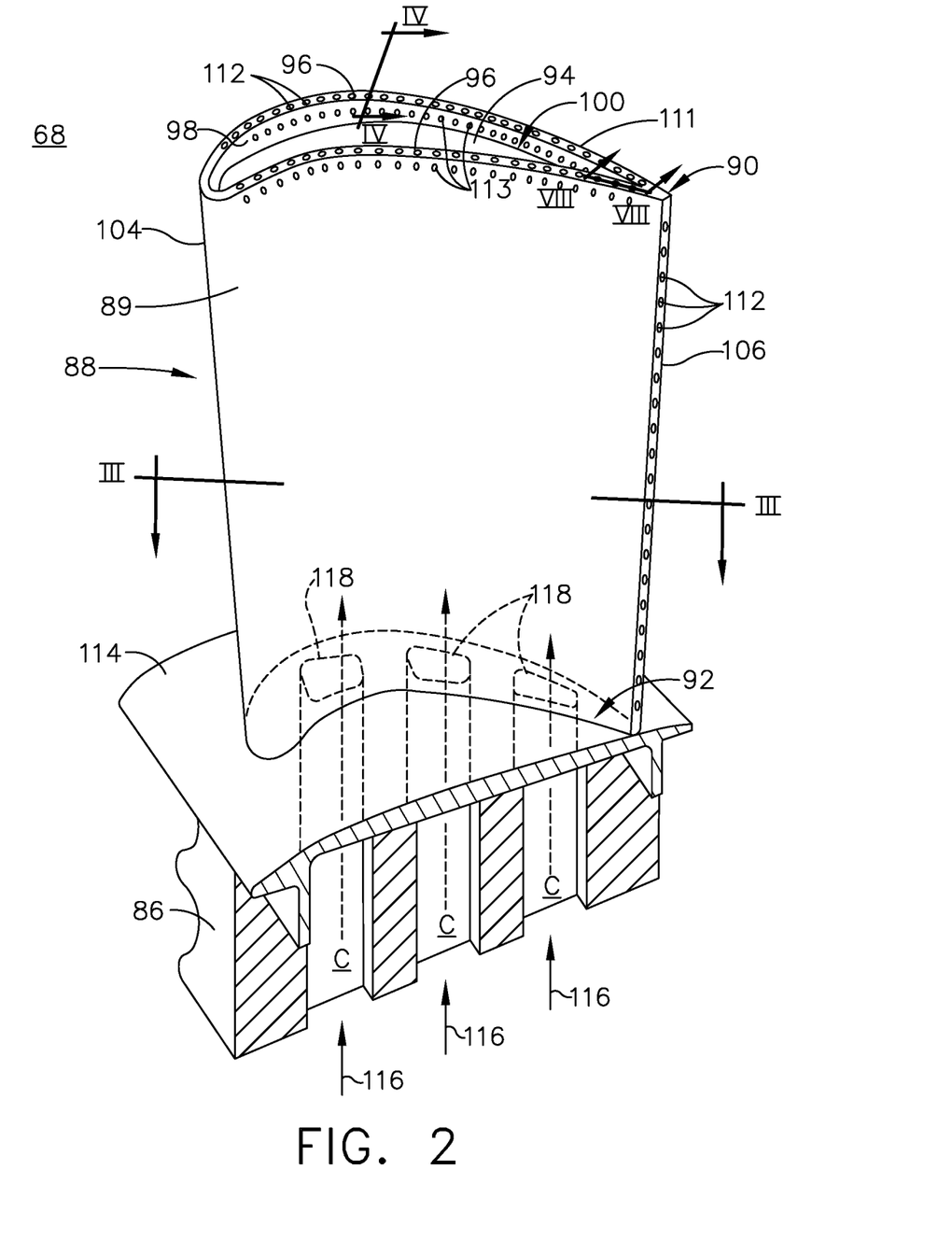
FIG. 2 is an isometric view of a blade for the engine of FIG. 1 including a tip rail with cooling holes.

Referring to FIG. 2, an engine component in the form of one of the turbine blades 68 includes a dovetail 86 and an airfoil 88. The airfoil 88 includes a tip 90 and a root 92 defining a span-wise direction there between. A tip wall 94 is provided at the tip 90, with a tip rail 96 having an exterior surface 98 and extending from the tip wall 94 to define a tip plenum 100. The airfoil 88 further includes a leading edge 104 and a trailing edge 106 defining a chord-wise direction there between. A plurality of film-holes 112 are provided along a distal end 111 of the tip rail 96 and can also be provided in the span-wise direction along the trailing edge 106 of the airfoil 88. Furthermore, a second set of film-holes 113 can be provided along the exterior surface 98 of the tip rail 96.

The airfoil 88 mounts to the dovetail 86 by way of a platform 114 at the root 92. The platform 114 helps to radially contain a turbine engine mainstream airflow driven by the blade 68. The dovetail 86 can be configured to mount to a turbine rotor disk on the engine 10 to drive the blade 68. The dovetail 86 further includes at least one inlet passage 116, with the exemplary dovetail 86 shown as a having three inlet passages 116. The inlet passages 116 extend through the dovetail 86 and the platform 114 to provide internal fluid communication with the airfoil 88 at corresponding passage outlets 118. A flow of cooling fluid C, such as airflow 77 and/or airflow 78 can be provided to the airfoil 88 through the inlet passage 116. It should be appreciated that the dovetail 86 is shown in cross-section, such that the inlet passages 116 are enclosed within the body of the dovetail 86.

Figure 3:
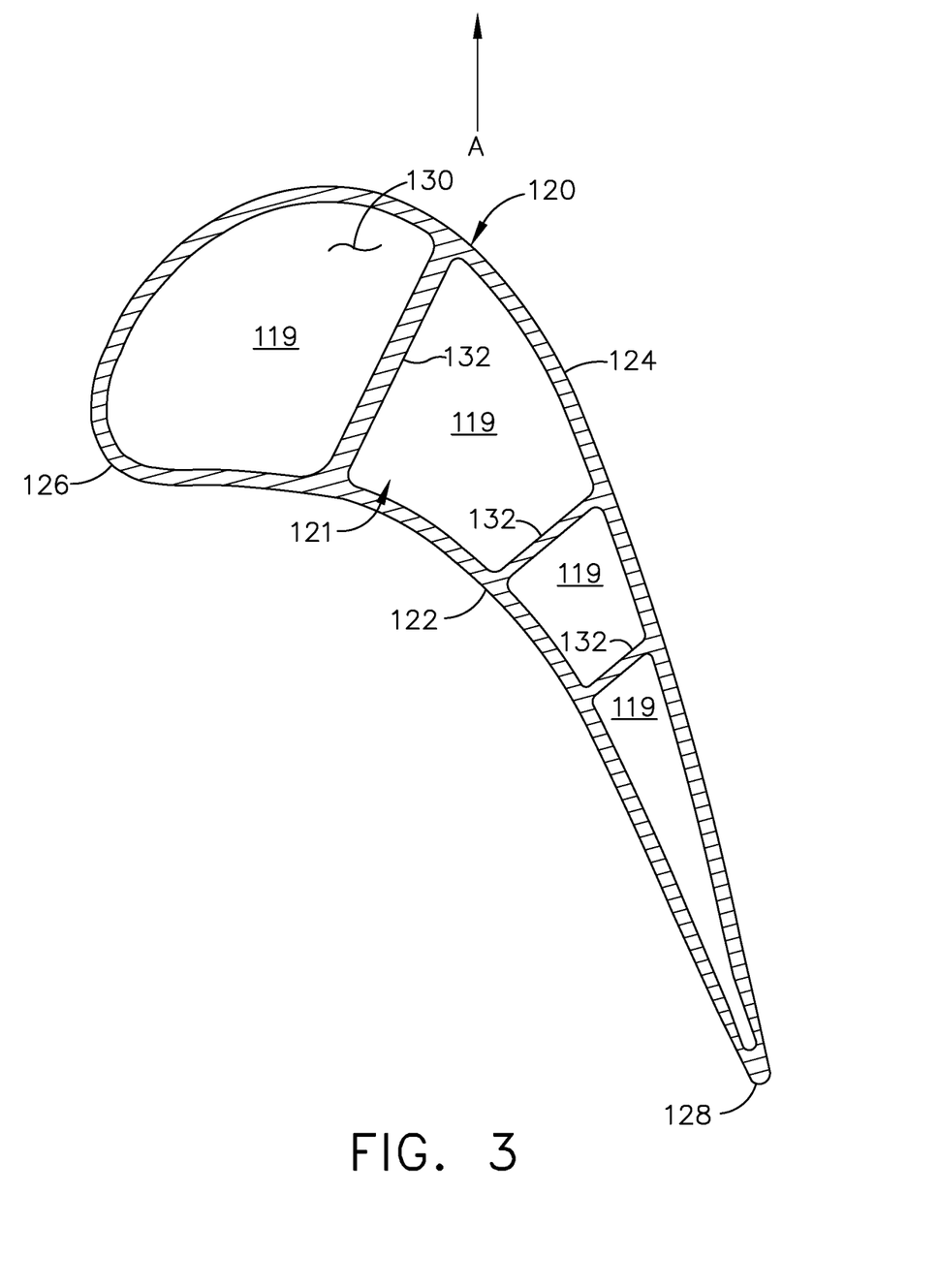
FIG. 3 is section view of the blade of FIG. 2 taken across section illustrating cooling passages within the blade.

Referring now to FIG. 3, the airfoil 88 includes an outer wall 120 with a concave-shaped pressure side 122 and a convex-shaped suction side 124 joined together to define the shape of airfoil 88. During operation, the airfoil 88 rotates in a direction such that the pressure side 122 follows the suction side 124. Thus, as shown in FIG. 3, the airfoil 88 would rotate upward toward the top of the page in the direction of arrow (A).

An interior 130 is defined by the outer wall 120. One or more interior walls shown as ribs 132 can divide the interior 130 into multiple cooling passages 119. Each of the passage outlets 118 can be fluidly coupled to one or more internal cooling passages 119. The inlet passages 116, passage outlets 118, internal cooling passages 119, and film-holes 112, can be fluidly coupled to each other and form one or more cooling circuits 121 within the airfoil 88.

It should be appreciated that the interior structure of the airfoil 88 is exemplary as illustrated. The interior 130 of the airfoil 88 can be organized in a myriad of different ways, and the cooling passages 119 can include single passages extending in the span-wise direction, or can be complex cooling circuits, having multiple features such as passages, channels, inlets, outlets, ribs, pin banks, circuits, sub-circuits, film-holes, plenums, mesh, turbulators, or otherwise in non-limiting examples. Preferably, the cooling passages 119 will be in fluid communication with the inlet passages 116 of the dovetail 86. At least one of the cooling passages 119 is in fluid communication with the film-holes 112.

Figure 4:
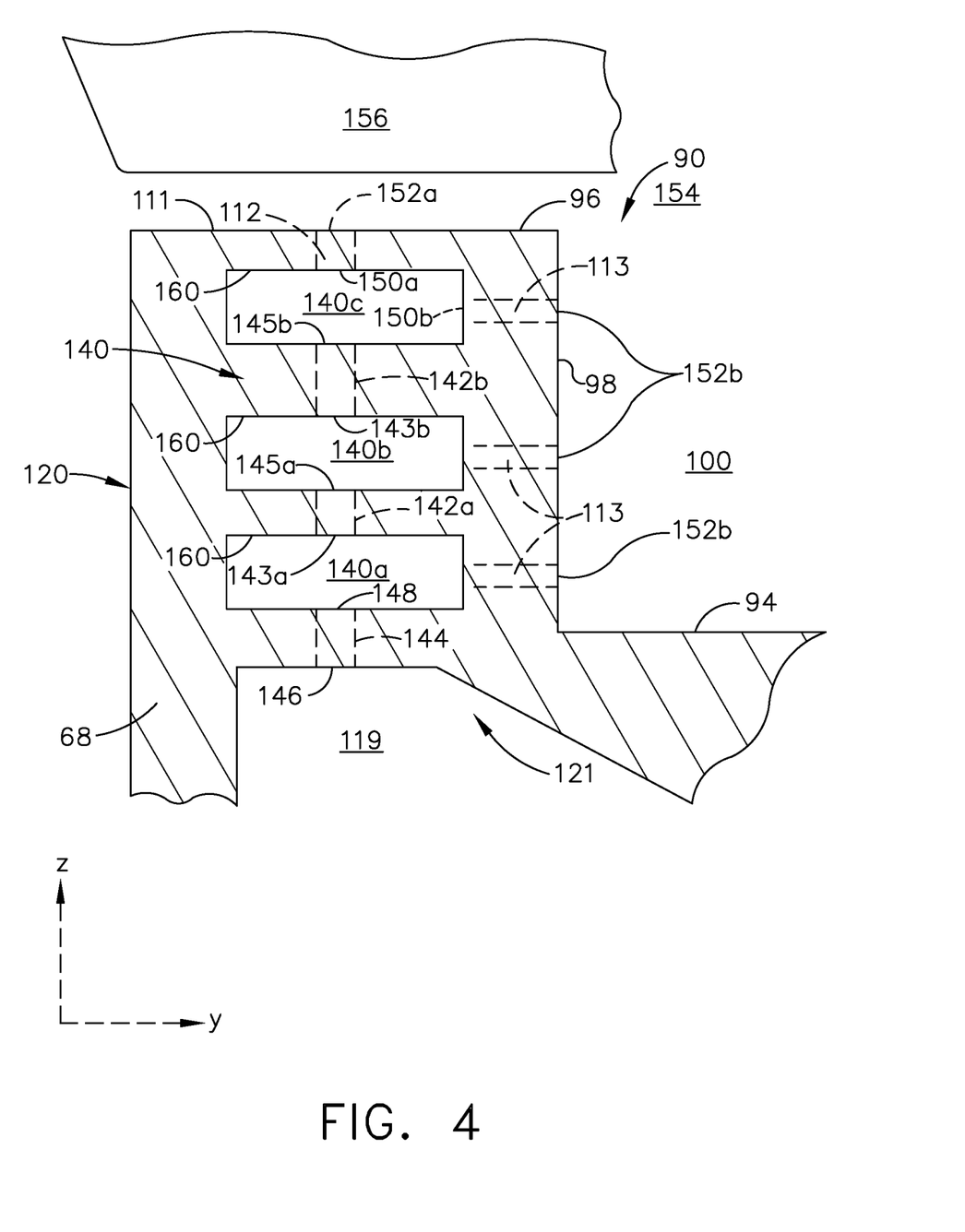
FIG. 4 is a section view of the tip rail of the blade of FIG. 2 taken across section IV-IV illustrating cooling cavities within the tip rail.

As can be seen more clearly in FIG. 4, a cross-section of the tip rail 96 taken across IV-IV of FIG. 2 shows a series 140 of spaced cooling cavities 140a, 140b, 140c stacked within the tip rail 96 to define a portion of the cooling circuit 121 as described herein. In a first aspect of the disclosure discussed herein, the spaced cooling cavities are radially-spaced cooling cavities 140a, 140b, 140c. While three radially-spaced cooling cavities 140a, 140b, 140c are illustrated, at least two are recommended, and it is further contemplated that four or more are possible. A plurality of connecting conduits 142a and 142b can fluidly couple the radially-spaced cooling cavities 140a, 140b, and 140c to each other. It is contemplated that the connecting conduits 142a and 142b can each having respective intermediate inlets 143a, 143b and outlets 145a, 145b.

A cooling conduit 144 having an inlet 146 fluidly coupled to the cooling passage 119 and an outlet 148 fluidly coupled to a first cooling cavity 140a connecting the series 140 of radially-spaced cooling cavities 140a, 140b, 140c to the cooling passage 119. It is contemplated that the cooling conduit 144 can be multiple cooling conduits 144 such that a plurality of cooling conduits 144 are formed between the cooling passage 119 and at least one of the cooling cavities 140a.

The plurality of film-holes 112 provided along the distal end 111 of the tip rail 96 can include a film-hole inlet 150a fluidly coupled to radially-spaced cooling cavity 140c and a film-hole outlet 152a fluidly coupled to an air source 154 surrounding the airfoil 88.

The second set of film-holes 113 provided along the exterior surface 98 of the tip rail 96 can include a film-hole inlet 150b fluidly coupled to radially-spaced cooling cavity 140c and a film-hole outlet 152b fluidly coupled to an air source 154 surrounding the airfoil 88 within the tip plenum 100.

It is further contemplated that the blade 68 can be located radially below a shroud segment 156. The shroud segment 156 can be a plurality of shroud segments 156 circumferentially arranged around the blades 68.

Figure 5:
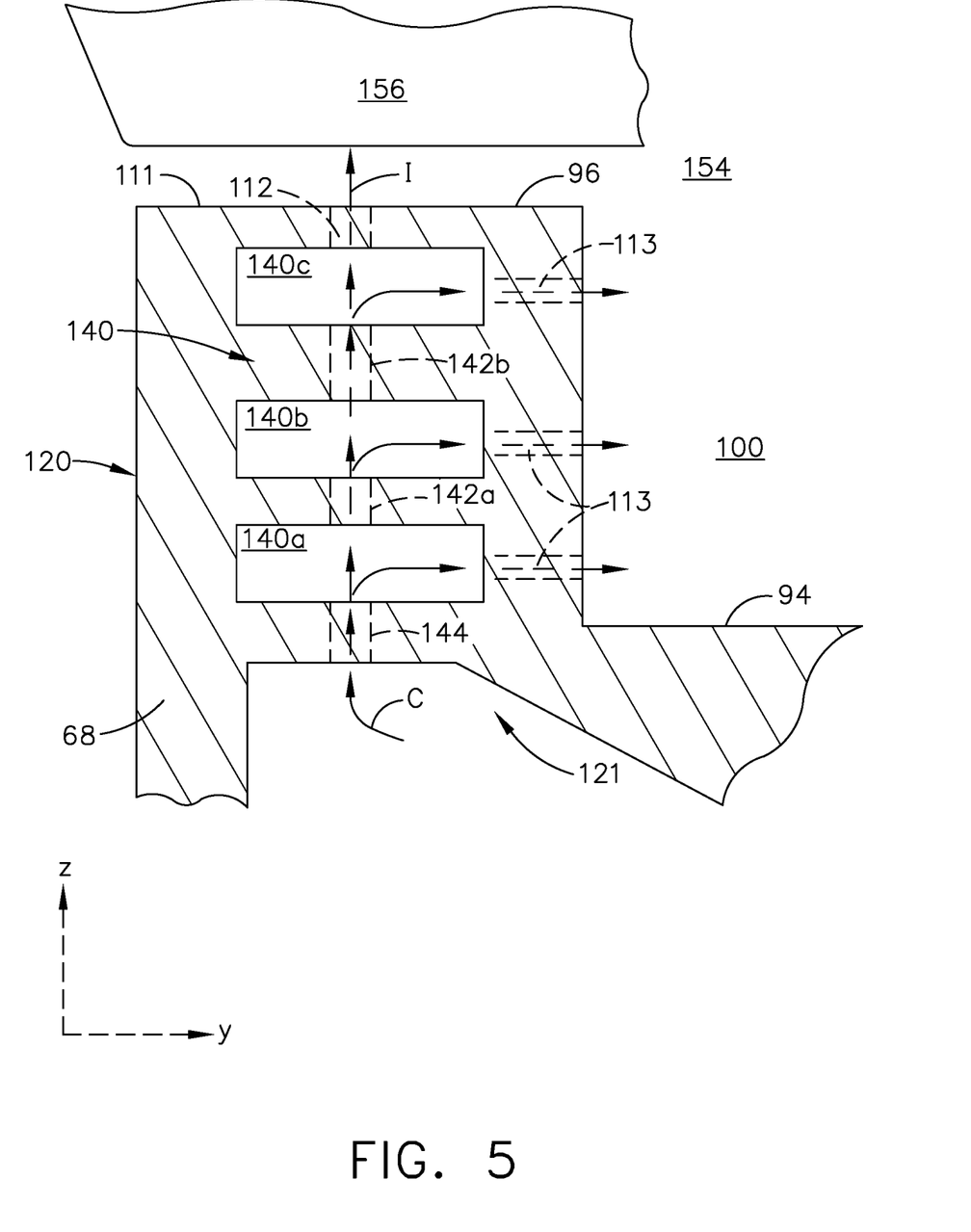
FIG. 5 is the section view from FIG. 4 illustrating a method of cooling the tip rail of the blade of FIG. 2.

Turning to FIG. 5 a method of cooling the tip rail 96 of the airfoil 88 is illustrated. Some numbers from FIG. 4 have been removed for clarity. The method includes supplying cooling air (C) through a series of the radially-spaced cooling cavities 140a, 140b, and 140c in the tip rail 96. The method can further include supplying the cooling air (C) sequentially first to cooling cavity 140a, then cooling cavity 140b, and finally cooling cavity 140c. It is further contemplated that the supplying can be provided to two or more cooling cavities 140a, 140b, and 140c and is not limited to the three illustrated. It is further contemplated that the method can include impinging (I) the cooling fluid (C) onto the shroud segment 156 to cool the shroud segment 156. Likewise, it is further contemplated that the method can include emitting the cooling fluid (C) through the outlet 152b into the tip plenum 100 to cool the tip rail 96.

During operation it is contemplated that the tip rail 96 can contact the shroud segment 156 and over a lifetime of the blade 68 contact between the tip rail 96 and the shroud segment 156 can cause rubbing away of portions of the tip rail 96. Forming a series 140 of radially-spaced cooling cavities 140a, 140b, 140c enables continued operation of the portion of the cooling circuit 121 having the radially-spaced cooling cavities 140a and 140b. In other words, as the tip rail 96 wears away, cooling cavity 140b replaces cooling cavity 140c in operation. In the event cooling air (C) can no longer be provided to cooling cavity 140c, the method simply includes providing cooling air (C) sequentially to a first cooling cavity 140a and then to the second cooling cavity 140b.

Figure 6:
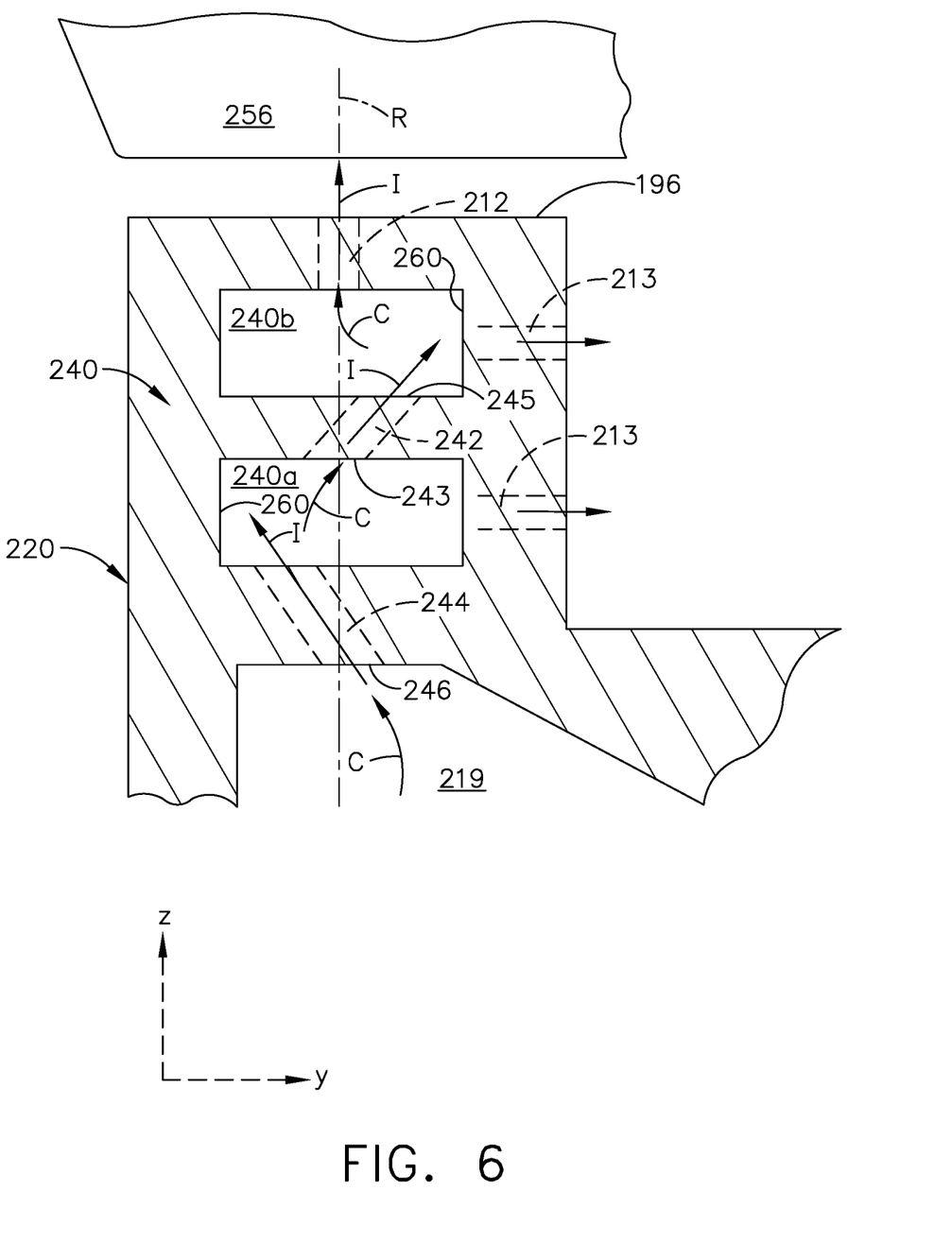
FIG. 6 is a section view of the tip rail of the blade of FIG. 2 taken across section IV-IV illustrating cooling cavities within the tip rail according to a second aspect of the disclosure described herein.

FIG. 6 illustrates a series 240 of radially-spaced cooling cavities 240a, 240b according to another aspect of the disclosure described herein. The series 240 of radially-spaced cooling cavities 240a, 240b has similarities to the series 140, therefore, like parts will be identified with like numerals increased by 100. It should be understood that the description of the like parts of the series 140 apply to those of the series 240, unless otherwise noted.

A cooling conduit 244 can have an inlet 246 fluidly coupled to a cooling passage 219 and an outlet 248 fluidly coupled to a first cooling cavity 240a. The inlet 246 is spaced from the outlet 248 such that the cooling conduit 244 there between is angled with respect to a radial axis (R). The angled orientation of the cooling conduit 244 can be formed such that a portion (I) of cooling air (C) impinges on an interior surface 260 of the cooling cavity 240a before moving into a subsequent cooling cavity 240b.

At least one connecting conduit 242a can fluidly couple the radially-spaced cooling cavities 240a and 240b to each other. It is contemplated that the connecting conduit 242 can extend from an inlet 243 to an outlet 248 such that the cooling conduit 244 there between is angled with respect to the radial axis (R). The angled orientation of the connecting conduit 242 can be formed such that a portion (I) of cooling air (C) impinges on an interior surface 260 of the cooling cavity 240b before exhausting through a film-hole 212.

Figure 7:
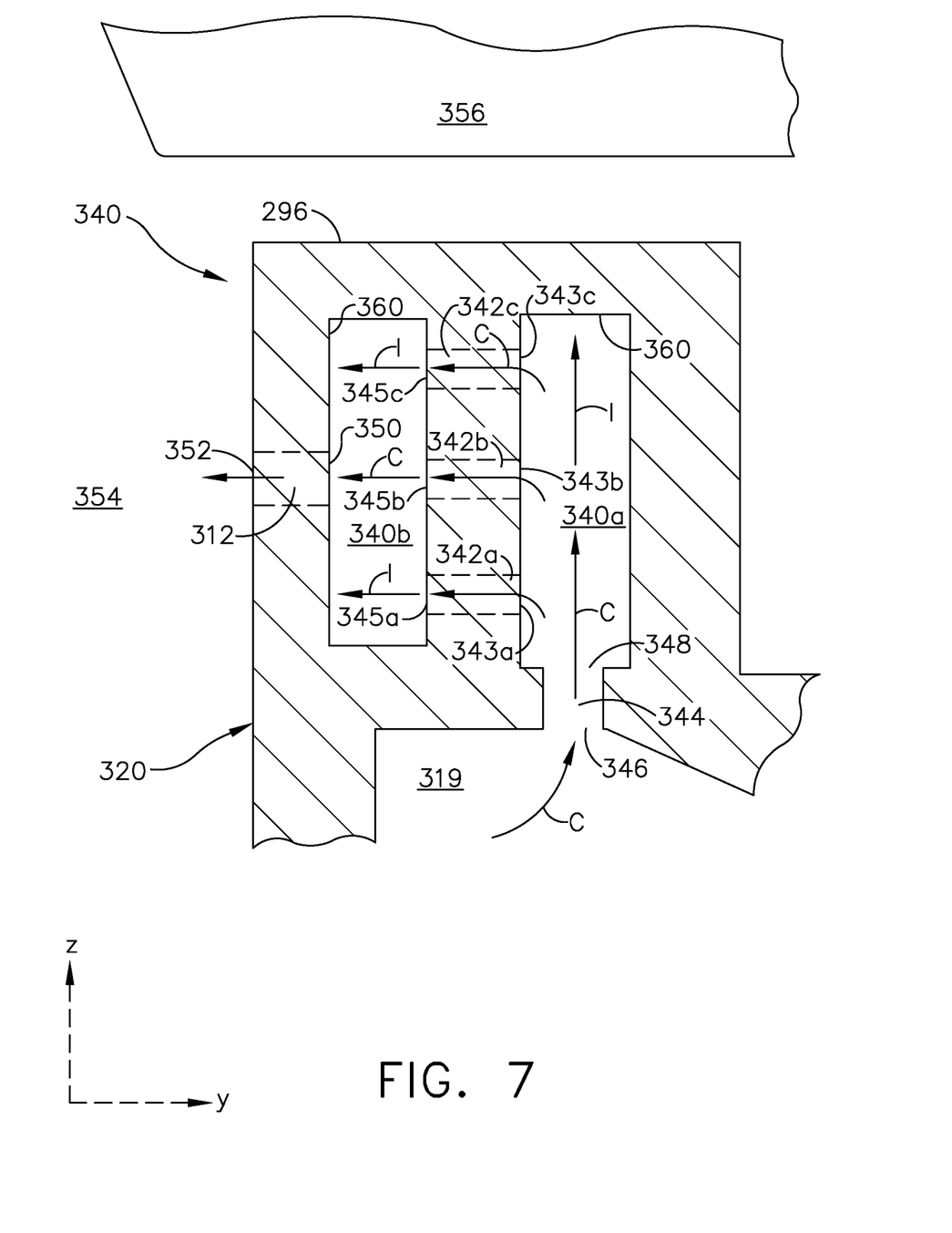
FIG. 7 is a section view of the tip rail of the airfoil of FIG. 2 taken across section IV-IV illustrating cooling cavities within the tip rail according to a third aspect of the disclosure described herein.

Turning to FIG. 7, it is further contemplated that the spaced cavities as discussed herein are circumferentially-spaced with respect to the engine centerline 12 rather than radially-spaced. A series 340 of spaced cooling cavities 340a, 340b has similarities to the series 140, therefore, like parts will be identified with like numerals increased by 200. It should be understood that the description of the like parts of the series 140 apply to those of the series 340, unless otherwise noted.

In this aspect of the disclosure, a first cooling cavity 340a is circumferentially spaced from a second cooling cavity 340b to define the series 340. A cooling conduit 344 can have an inlet 346 fluidly coupled to a cooling passage 319 and an outlet 348 fluidly coupled to the first cooling cavity 340a. A connecting conduit 342, illustrated as three connecting conduits 342a, 342b, 342c, can each extend from an inlet 343a, 343b, 343c fluidly coupled to the first cooling cavity 340a to an outlet 345a, 345b, 345c fluidly coupled to the second cooling cavity 340b.

At least one film-hole 312 can be along an outer wall 320 of tip rail 296 and can include a film-hole inlet 350 fluidly coupled to the second cooling cavity 340b and a film-hole outlet 352 fluidly coupled to an air source 354 surrounding the airfoil 88.

The method as discussed herein can further include impinging (I) cooling fluid (C) both radially and circumferentially to maximize the amount of heat removed by the cooling fluid (C). In this aspect of the disclosure, it is further contemplated that the method can also include emitting the cooling fluid (C) through the at least one film-hole 312 along the outer wall 320.

Figure 8:
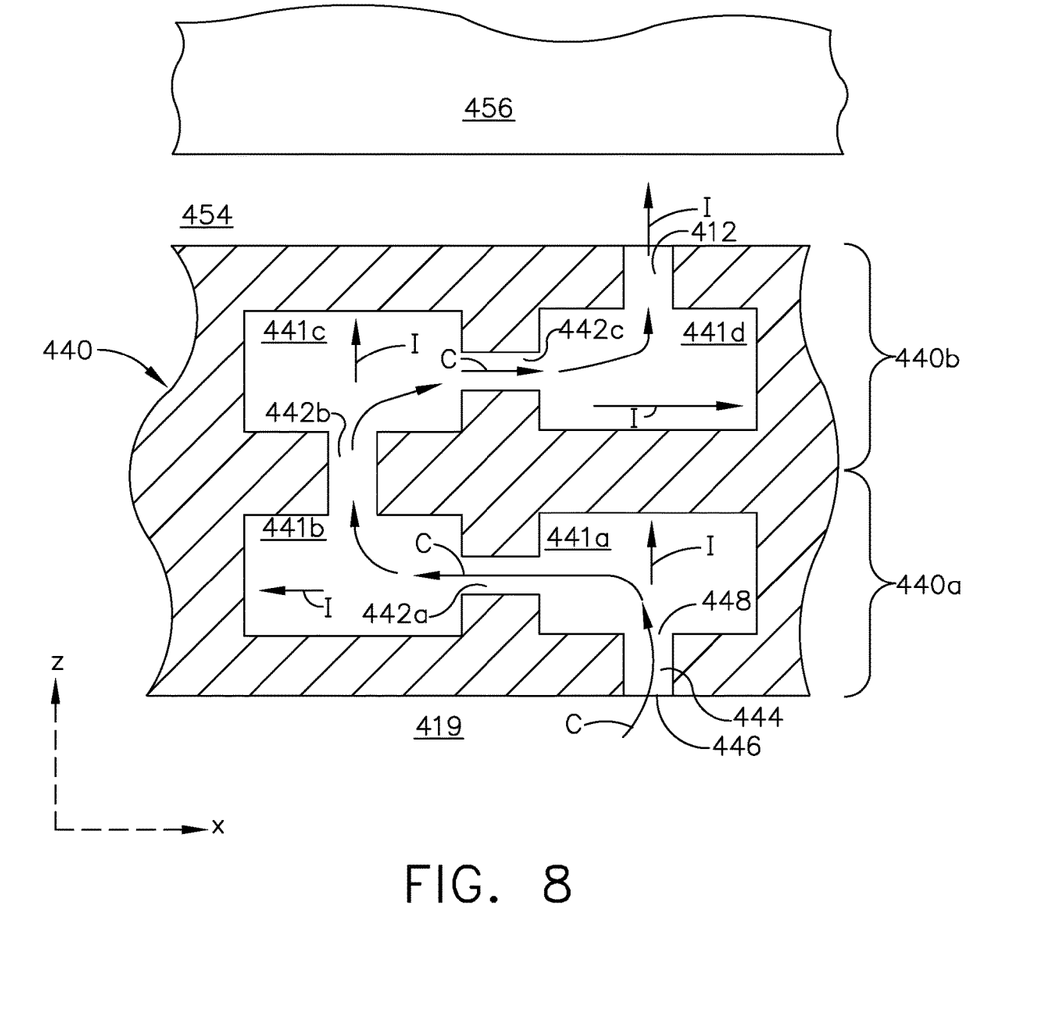
FIG. 8 is a is a section side view of the tip rail of the airfoil of FIG. 2 taken across section VIII-VIII illustrating cooling cavities within the tip rail according to a fourth aspect of the disclosure described herein.

In yet another aspect of the disclosure discussed herein as depicted in FIG. 8 a side cross-section taken across VIII-VIII of FIG. 2 of the tip rail 96 with at least two radially-spaced cooling cavities 440a, 440b. The first set of cavities 440a can include at least two first and second axially-spaced cavities 441a, 441b and the second set of cavities 440b, radially-spaced from the first set of cavities 440a, can include third and fourth axially-spaced cavities 441c, 441d. The first and second axially-spaced cavities 441a, 441b are radially stacked below the third and fourth axially-spaced cavities 441c, 441d to define a series 440 of radially-spaced cooling cavities 440a, 440b. The series 440 has similarities to the series 140 therefore, like parts will be identified with like numerals increased by 300.

The first set of radially-spaced cavities 440a can include a cooling conduit 444 having an inlet 446 fluidly coupled to a cooling passage 419 and an outlet 448 fluidly coupled to a first axially-spaced cavity 441a. A first connecting conduit 442a, oriented primarily in an axial direction, can fluidly couple the first axially-spaced cavity 441a to the second axially-spaced cavity 441b. A second connecting conduit 442b, oriented primarily in a radial direction, can fluidly couple the second axially-spaced cavity 441b to the third axially-spaced cavity 441c. In doing so, the second connecting conduit 442b couples the first set of radially-spaced cavities 440a to the second set of radially-spaced cavities 440b. A third connecting conduit 442c can fluidly couple the third axially-spaced cavity 441c to the fourth axially-spaced cavity 441d. Film-holes 412 can fluidly couple the fourth axially-spaced cavity 441d to an exterior air source 454. It is further contemplated that the second set of film-holes are connected to one or more of the cavities as illustrated, by way of non-limiting example, in FIGS. 4, 6, and 7.

The method as discussed herein can further include impinging (I) cooling fluid (C) both radially and axially to maximize the amount of heat removed by the cooling fluid (C).

While illustrated as four cavities, it should be understood that the description and orientation of the conduits, film-holes, and cavities as described herein is for illustrative purposes and not meant to be limiting. For example each set of spaced cavities could include three or more axially-spaced cavities each fluidly coupled to proximate cooling cavities. The arrangement of cooling cavities as illustrated in FIG. 8 can be applied to the arrangements discussed regarding FIG. 4, FIG. 6 and FIG. 7 or in any combination discussed herein.

Furthermore, the film-holes and second set of holes as discussed herein are not limited to straight holes. Impingement holes can be curved or can be angled, as illustrated in FIG. 6 to cool the sides of the tip rail.

The tip rail of the blade is subjected to high heat loads and frequently rubs against the shroud during operation. Designs accounting for the entire rail rubbing away during operation are necessary to continue cooling in this region as rub can remove cooling features or close cooling holes, completely cutting off coolant flow from this region. As discussed herein a series of cavities spaced in the radial direction enables impingement cooling to be delivered directly to the top of the rail, where a high demand for cooling exists. Additionally, if the top cavity rubs away, there is one below it to take its place in order to continue impingement cooling.

In the event that the rail rubs away and the top cooling hole closes, cooling flow can still be exhausted through the second set of holes, allowing the top of the rail to still be cooled. As more of the rail rubs away, the top impingement cavity will completely open up and the one below it will take its place. In this way, a normal or near normal level of cooling effectiveness can be maintained until the rail is almost completely gone.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A blade for a turbine engine, the blade comprising:
a body defining an interior, and extending axially between a leading edge and a trailing edge to define a chord-wise direction and radially between a root and a tip to define a span-wise direction, which terminates in a tip end wall and a tip rail extending from the tip end wall;
at least one cooling passage formed in the interior;
at least two radially-spaced cooling cavities within the tip rail and comprising at least one cooling conduit fluidly coupled to the at least one cooling passage;
at least one connecting conduit fluidly coupling the at least two radially-spaced cooling cavities; and
a set of film-holes having an inlet fluidly coupled to at least one of the radially-spaced cooling cavities and an outlet provided on an exterior surface located along a radial distal end of the tip rail;
wherein each of the at least two radially-spaced cooling cavities comprises a set of cavities and each set of cavities comprises at least two axially-spaced cooling cavities; and,
wherein the at least two axially-spaced cooling cavities are fluidly coupled to each other by another connecting conduit.

2. The blade of claim 1 wherein at least a portion of the exterior surface of the tip rail defines a tip plenum and a second set of film-holes are fluidly coupled to the tip plenum.

3. The blade of claim 1 wherein the at least one cooling conduit comprises multiple cooling conduits.

4. The blade of claim 1 wherein the at least one connecting conduit comprises multiple connecting conduits.

5. The blade of claim 1 wherein the at least two radially-spaced cooling cavities comprises three or more radially-spaced cooling cavities.

* * * * *